June 20, 1950 W. WATERMAN 2,512,190
AUTOMATIC CUTOFF DEVICE
Filed March 6, 1944 2 Sheets-Sheet 2

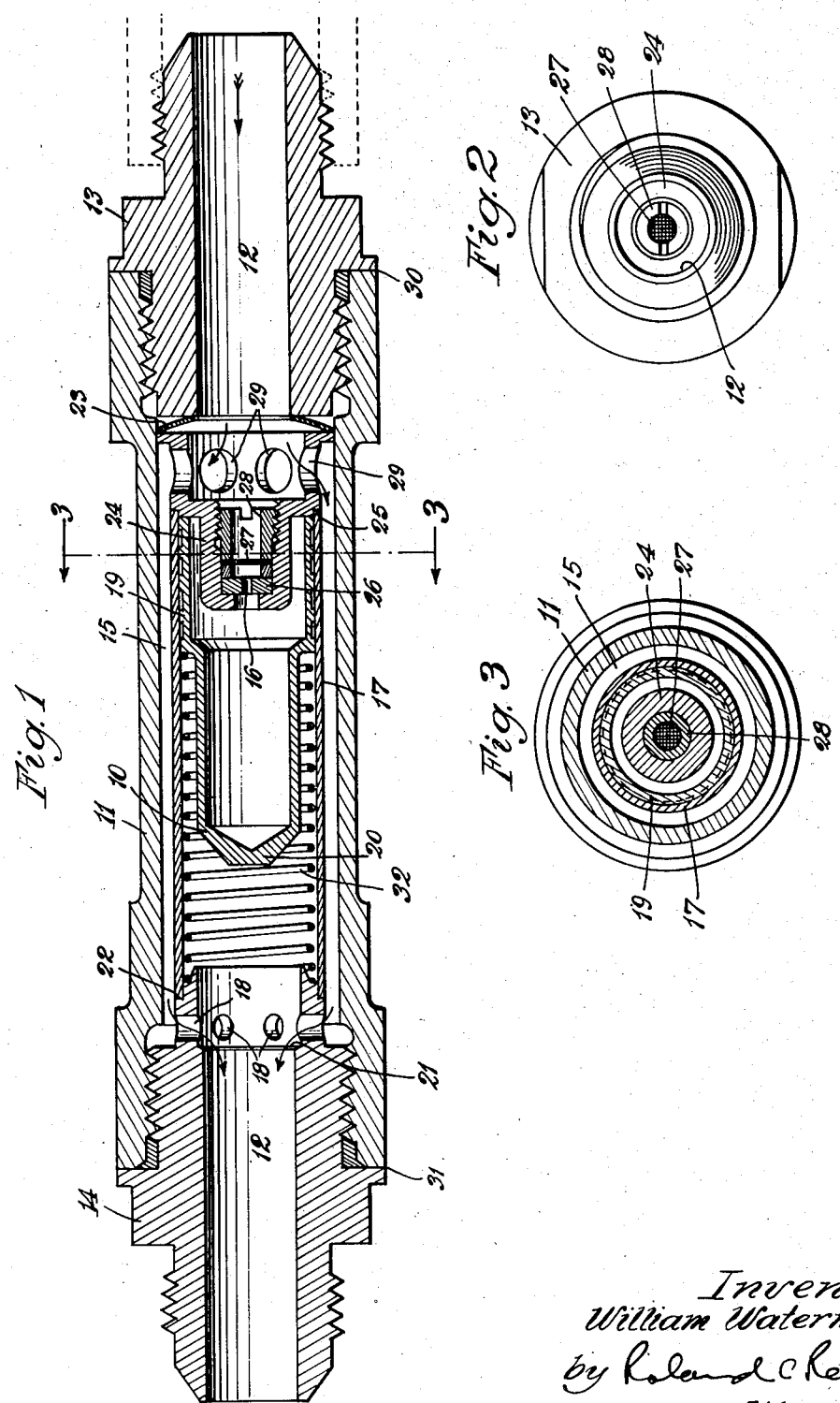

Inventor
William Waterman
by Roland C Rehm
Attorney.

Patented June 20, 1950

2,512,190

UNITED STATES PATENT OFFICE 2,512,190

AUTOMATIC CUTOFF DEVICE

William Waterman, Chicago, Ill.

Application March 6, 1944, Serial No. 525,275

7 Claims. (Cl. 137—153)

This invention relates to the protection of hydraulic lines and systems and among other objects aims to provide means which protect against complete loss of oil or other hydraulic fluid in case of rupture as by gun fire in the case of aircraft.

The invention may be readily understood by reference to one illustrative embodiment thereof shown in the accompanying drawings.

In said drawings:

Fig. 1 is a longitudinal section of an automatic cutoff device;

Fig. 2 is an end view thereof viewing the device from the right hand of Fig. 1;

Fig. 3 is a cross section taken on the plane 3—3 of Fig. 1;

Fig. 4 is a different form of automatic cut-off device employed for systems having a separate return flow line; and, Fig. 5 is a diagram illustrating the use of the device of Fig. 4 in a system having a return flow line.

Figure 5:
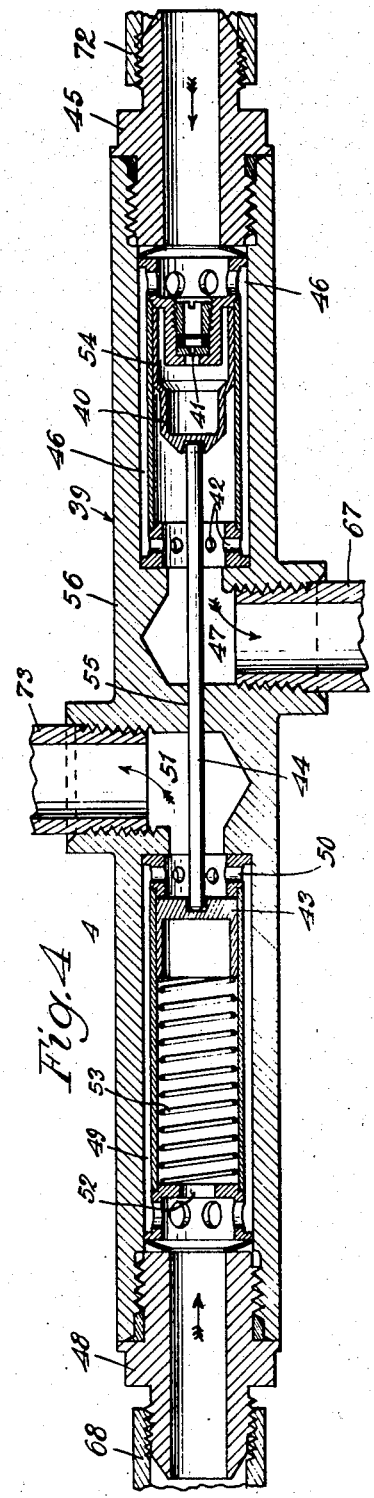

The illustrative cut-off device embodies means for dividing the hydraulic flow and controlling the entire flow by means of one of the divided streams. Generally the flow is divided into a main stream which comprises the greater portion of the total flow and into an auxiliary stream of small flow having substantially a fixed ratio to the main stream and which is employed to control the entire flow, in this case by closing the line after a substantially predetermined volume has passed through the device.

In the illustrative device the valve 10 is enclosed within a housing 11 adapted to be incorporated in and form a part of the line which is represented by the passage 12. In this case the housing is provided with standard threaded couplings 13 and 14 by means of which the device may be coupled in a line in which fluid flow entering the device through the coupling 13 is divided into a main stream which flows through the annular passage 15 and a relatively small diverted stream which flows through the orifice 16. The annular passage 15 is formed between the housing proper and a cylinder 17 within which the valve slides. The cross-sectional area of the annular passage 15 is as large as and preferably larger than the cross-sectional area of the passage 12. Fluid re-enters the passage 12 after passing around the valve (in open position) through a control hole or series of control holes 18 of a size (determined as presently explained) to produce a pressure drop having a definite relation to the rate of flow for effecting the desired operation of valve 10. Valve 10 is embodied in an operating piston 19 slidable in cylinder 17. The down stream side 20 of the piston is freely exposed to the line pressure at the discharge side of the control holes 18 and the piston is therefore responsive to the pressure drop occurring between its upstream and downstream sides, and therefore moves toward closed position at a rate determined by the rate of flow of the small stream through orifice 16 (under the pressure differential existing between the up stream side of orifice 16 and the down stream face 20 of the piston). When the valve 10 reaches its seat 21 (located down stream relative to control holes 18) flow through the line is cut off.

In the present design, cylinder 17 is seated against a shoulder in coupling 14 above the control holes and is held tightly against such shoulder by spring washer 23 which bears against the orifice fitting 24 whose shoulder 25 bears against the upper end of cylinder 17. Orifice 16 is formed in a removable insert 26 seated in orifice fitting 24 to permit easy change of orifice sizes and shapes. The insert and a filter screen 27 (between which is a spacer washer) are held in place by threaded eyelet 28. The orifice fitting 24 is also provided with a series of holes 29 to connect passage 12 with passage 15, sufficiently large with respect to the section of passage 12 as not to cause any substantial pressure drop at this point. Coupling 13 bears against spring washer 23 to maintain tight joints at the ends of the cylinder 17. The spring washer also compensates for slight inaccuracies in relative lengths of various elements so as to insure tight joints at 30 and 31 between the couplings 13 and 14 and the ends of housing 11.

A light spring 32 inside cylinder 17 is advantageously provided to resist undesired closing movements of the valve when under gravitational forces and particularly under inertia forces resulting from acceleration and deceleration in diving in aircraft. The spring, however, is made as light as possible and for that purpose the valve 10 and its piston are made very light. Preferably the spring is slightly precompressed and its force against the valve is about four or five times the weight of the valve thus making it possible to withstand forces of four or five times gravity in diving. Except for the light spring pressure against the valve, the latter offers no other resistance to movement and is therefore substantially responsive to flow through orifice 16. In stationary installations or if the device be so located that the valve is not affected by gravity or inertia, the spring can be dispensed with. In the present case it should be understood that while the actual fluid flowing through orifice 16 does not itself re-join the main stream at the control holes 18, an equivalent flow (that displaced by the movement of the valve) does join the main stream.

The device operates to prevent complete loss of hydraulic fluid or oil by closing the line if the volume of flow substantially exceed that necessary to operate the particular instrumentality, such as a hydraulic piston, to which the line is connected. In aircraft, for example, many mechanisms such as turrets, wing flaps, wheel raising and lowering apparatus are operated by hydraulic pistons and cylinders which require a predetermined volume of oil for their operation. If the flow exceed this predetermined volume (as would be the case if the line were punctured or broken) the device operates to close the line. In normal operation the valve starts to close as soon as fluid flows in the line toward the mechanism to be operated, but it does not reach its seat before the aforesaid predetermined volume has passed through the line. It should be understood that in normal operation the flow and the pressure drop occurring in the device always substantially exceed that necessary to overcome the light resistance of spring 32. Return movement of the hydraulic piston or other device operated by the line causes reverse flow in the same line thus returning the valve to fully open position.

In operation the valve closes when a volume of hydraulic fluid has passed through the device equivalent to $$\frac{\text{Rate of flow through control holes 18}}{\text{Rate of flow through orifice 16}} \times \text{displacement of piston}$$

The piston displacement is the volume represented by the movement of the piston 19 from its fully open position as shown in Fig. 1 to valve closed position. In this connection it should be understood that the pressure drop through passage 15 and the control holes 18 is substantially the same as that through orifice 16, except that the pressure against piston 19 must be enough higher than the back pressure against its back 20 to overcome the light spring resistance. For practical purposes this difference in pressures may be ignored.

The rate of flow of hydraulic fluid through the control holes 18 and the orifice 16 may be represented by the following:

$$Q = CAP^{xy}$$

Where,

Q is the rate of flow in gallons per minute
C is a constant
A is the area of the control holes or orifice as the case may be
P is the pressure drop effected by the control holes 18 or the orifice 16
$x$ is a variable depending upon the physical characteristics of the control holes or orifice
$y$ is a variable depending upon the viscosity of the fluid and upon the physical characteristics of the control holes or orifice For a constant ratio of flow between the main stream and that passing through orifice 16 (despite variations in viscosity of the hydraulic fluid) the control holes and orifice 16 should be designed so that $x$ is substantially the same for both. Normally $x$ is about .5. It may be decreased with increase in the size of the holes or orifice; it will increase as the length of the holes or orifice increases and as the shape of the holes or orifice departs from a sharp edged orifice and also as the cross-sectional shape departs from that of a round hole. In this connection it should be understood that the size of the holes or orifice may be varied without changing the ratio between the control hole area and orifice area by altering the number of holes or orifices. In other words, the value of $x$ is different for a plurality of small holes aggregating a given orifice area from that of a single hole of the same total area. It is also affected by the relative section of passage 15. These relationships provide means for relatively adjusting the characteristic of the control holes and orifice so that $x$ will be substantially the same for both.

The variable $y$ which depends upon the viscosity of the fluid and upon its action in the control holes or orifice has a maximum value of unity, and generally decreases as viscosity increases. Its rate of decrease as viscosity increases will decrease as the shape of the hole approaches a sharp edged orifice, and this rate of decrease will be zero if the hole is a perfect sharp edged orifice. In other words, with a perfect sharp edged orifice, $y=1$ and remains constant regardless of changes in viscosity. It will be understood that a perfect sharp edged orifice is largely theoretical, and in practice, and particularly for small orifices, they do have some thickness. The rate of decrease of $y$ as viscosity increases will generally increase as the length of the hole or orifice increases and as the size of the hole or orifice decreases and also as the cross-sectional shape of the hole or orifice departs from that of a round hole. By applying the above laws relative to the variable $y$, changes in viscosity may be made to effect the flow through the control holes and orifice 16 equally. Summarizing: adjustment in the diameter, length, and cross-sectional shape of the control holes and orifice may be employed to secure the desired characteristics. These may be readily tested simply by making measurements of flow through the control holes and orifice separately. The result is that it is possible to adjust the control holes and orifice relatively so that the ratio of the rate of flow through the control holes and that through the orifice 16 is constant regardless of changes in viscosity or the total rate of flow through the device.

Spring 32 of course causes a slight departure from the desired constant ratio, but this is so slight that it may be ignored for practical purposes. It also will be understood that if the flow through the device were very low the pressure drop through the passage 15 and control holes 18 would not be sufficient to overcome the force of the spring and the valve which therefore would not move under the action of the fluid flow. However, in actual practice the pressure drop is substantially higher than the minimum pressure drop necessary to overcome the spring.

While the pressure drop through the large holes 29 leading to passage 15 is held to a minimum by making them large, it should be noted that both these holes and the section of passage 15 may be employed to decrease the variable $y$ by making the passage 15 smaller so that a substantial part of the total pressure drop takes place in the passage. This has an effect on the variable y similar to what would result by increasing the length of and/or number of control holes 18. It should be understood that when the number of control holes is increased, this does not necessarily involve an increase in the aggregate sectional area of the control holes. This may be held constant by increasingly reducing the diameter of the control holes. The effect of increasing the length of control holes 18 is to increase friction of the hydraulic fluid with the surfaces of the passages, and thereby accentuate the effect of increase in viscosity. As a practical matter the surfaces of the passage 15 may be used to serve the function of increase in length of control holes 18 by a proper reduction in section of the passage 15.

Systems employing a separate return line may advantageously be protected by making the device responsive only to interruption or reduction in rate of flow through the return line.

One example of such a system is the lubricating oil cooling system for aircraft motors. A protecting device 39 designed for systems having separate return lines is illustrated in Fig. 4. In the device there illustrated, the valve 40 corresponds to the valve 10 and has associated therewith orifice 41 and control holes 42 which function as described in connection with the orifice 16 and the control holes 18 in the device illustrated in Fig. 1. However, normal response to flow is prevented by a counterbalancing piston 43 against which the flow in the return line acts and which is connected by appropriate means with valve 40 to prevent closing movement of the latter so long as there is a normal return flow in the return line. In the present case this connection is represented by a rod 44 between piston 43 and valve 40, preventing movement of the latter under the aforesaid circumstances. However, any other means for mechanically connecting the piston and valve to secure the same result may be employed. They need not be in line as here shown.

In the illustrative device, flow enters through coupling 45, passes through the by-pass passage 46 around the valve when in open position and after emerging from control holes 42, leaves through passage 47. Piston 43 is subject to the pressure of return flow which in this case enters through coupling 48 and passes around piston 43 through a by-pass passage 49 and control holes 50 leaving through passage 51. The piston is exposed to direct pressure in the return line through the hole 52 which need not be a restricted orifice. An appropriate pressure drop for developing needed counterbalancing pressure against piston 43 is produced by the control holes 50 which are restricted similarly to control holes 18 and produce the desired pressure drop for counterbalancing the pressure drop which occurs at control holes 42. If the piston 43 be of the same effective area as the piston 54 of valve 40, then the pressure drop should be the same as that around valve 40. Spring 53 serves the same function as spring 32, but in this case is applied to piston 43 instead of to valve piston 54.

Rod 44 passes through a bore 55 at housing 56. This bore is sufficiently free so as not to interfere with free movement of the rod. The clearance, however, between the rod and the bore is not great enough to allow any substantial short circuiting of fluid from passage 47 to passage 51. The rod loosely engages both the valve and the piston 43 so as not to cause any binding if there be a slight lack of alignment.

If flow in the return line be cut off, counterbalancing pressure against piston 43 disappears and valve 40 thereupon acts exactly as the device of 51 to cut off flow after the passage of a predetermined volume of flow in the line. However, the device also will operate if there be any substantial reduction in return pressure against piston 43 as would occur in the case of a substantial lag or other partial reduction of return flow. In that event the pressure drop through control holes 50 would not be sufficient to develop adequate counterbalancing pressure against valve 40 and the latter would move towards its seat. Such movement would, however, be at a slower rate than would be the case if there were no pressure against piston 43 because net pressure drop through control holes 50 would be counteracted to some extent by resistance of piston 43. While this would result in the passage of a much larger volume of fluid past valve 40 before the latter closed, the net loss of fluid before closing would be approximately the same (as would be the case if there were no return flow) because of the circumstance that some flow returned through the return line.

In Fig. 5 the aforesaid device is shown connected in an engine oil cooling system. The operation of systems of this character is fully described in my co-pending application Ser. No. 519,483. It will be understood, however, that the present device is applicable to other systems having a separate return line wherein it is desired to interrupt flow upon failure or partial failure of flow in the return line. However, in the case of engine oil cooling and other systems where air in the system and therefore in the return line may simulate interruption or partial interruption of return flow as in the case of actual rupture of the line, it is desirable to delay actual closing of the line, until a predetermined volume (in case of engine oil cooling systems equivalent to the maximum amount of air likely to reside in the system) has escaped.

In the illustrative engine oil cooling system of Fig. 5 oil is withdrawn from the oil storage tank 60 by oil pressure pump 61 and delivered through one or more lines 62 to various parts of the engine 63. Eventually the oil collects in a sump 64 such as the crank case from which it is withdrawn by the scavenger pump 65 and delivered thereby to the oil cooler 66 through line 67 and discharged from the oil cooler to the storage tank through line 68. The protecting device 39 is interposed in the cooler supply and return lines 67 and 68 and is adapted upon interruption or reduction of normal flow in return line 67 to short circuit the cooler 66 by closing line 68. In that event the pressure created by scavenger pump 65 opens a relief valve 69 and returns fluid direct from the sump to the storage tank 60 through line 71. The relief valve is set to operate at pressure above the maximum normal operating pressure. The scavenger pump is ordinarily a low pressure pump whose normal operating pressure is generally 25 to 30 pounds per square inch.

In normal operation the scavenger pump delivers fluid to the fuse through line 72 and fluid leaves the fuse through line 73 which discharges into the storage tank.

In other systems having a separate return line, it will be understood that the return line enters the fuse at the coupling 48 and leaves the same through passage 51.

Obviously, the invention is not limited to the details of the illustrative device since these may be variously modified. Moreover, it is not indispensable that all features of the invention be used conjointly since various features may be employed in different combinations and sub-combinations.

Having described my invention, I claim:

1. An automatic cut-off device comprising in combination a housing having an inlet and an outlet adapted to be placed in a liquid line, a passage in said housing connecting said inlet and said outlet, a valve seat in said housing between said outlet and passage, a valve in said housing cooperable with said seat and arranged to be set in open position, means operating by differential pressure on its opposite sides for predetermined movement from a predetermined retracted position for seating said valve, said passage having restricting means to produce a pressure drop having a definite relation to the rate of flow therein, one side of the operating means being arranged to be subjected to pressure in the line downstream of said restricting means for urging said operating means toward said retracted position, said housing having means including an orifice for diverting a portion of the flow from said passage upstream of said restricting means and to direct the same against the opposite side of the operating means, said orifice and restricting means being subjected to substantially the same pressure on their upstream sides and being designed to maintain a substantially constant ratio of flow through the passage and through said diverting means despite variations in viscosity in the liquid in the line, and said orifice being designed to restrict flow through said diverting means relative to flow through said restricting means so that a substantially predetermined volume of liquid will flow through said passage before seating of said valve.

2. An automatic cut-off device comprising in combination a housing having an inlet and an outlet adapted to be placed in a liquid line, a passage in said housing connecting said inlet and said outlet, a valve seat in said housing between said outlet and passage, a valve in said housing cooperable with said seat and arranged to be set in open position, means operating by differential pressure on its opposite sides for predetermined movement from a predetermined retracted position for seating said valve, said passage having restricting means to produce a pressure drop having a definite relation to the rate of flow therein, one side of the operating means being arranged to be subjected to pressure in the line downstream of said restricting means for urging said operating means toward said retracted position, said housing having means including an orifice for diverting a portion of the flow from said passage upstream of said restricting means and to direct the same against the opposite side of the operating means, said orifice and restricting means being subjected to substantially the same pressure on their upstream sides and being designed to maintain a substantially constant ratio of flow through the passage and through said diverting means despite variations in rate of flow of the liquid in the line, and said orifice being designed to restrict flow through said diverting means relative to flow through said restricting means to permit a substantially predetermined volume of liquid to flow through said passage before seating of said valve.

3. An automatic cut-off device comprising in combination a housing having an inlet and an outlet adapted to be placed in a liquid line, a passage in said housing connecting said inlet and said outlet, a valve seat in said housing between said outlet and passage, a valve in said housing cooperable with said seat and arranged to be set in open position, a slidable piston connected with said valve, said passage having restricting means to produce a pressure drop having a definite relation to the rate of flow therein, one side of the piston being arranged to be subjected to pressure in the line downstream of said restricting means, said housing having means including an orifice for diverting a portion of the flow from said passage upstream of said restricting means and to direct the same against the opposite side of the piston, the pressure drop across said orifice being effective to cause flow through said orifice to displace said piston from a predetermined retracted position and to seat said valve upon a predetermined volume of flow through said orifice, said orifice and restricting means being designed to maintain a substantially constant ratio of flow through the passage and through said diverting means despite variations in rate of flow in the line, said orifice being designed to restrict flow through said diverting means relative to flow through said restricting means so that a substantially predetermined volume of liquid will flow through said passage before seating of said valve.

4. An automatic cut-off device for hydraulic circuits having supply and return lines comprising in combination a housing in the supply line and having therein valve means including a valve for interrupting flow in said line and arranged to be set in open position, said housing having means including an orifice for diverting a portion of the flow and directing the same against said valve for applying closing force to the valve, said valve and orifice being so constructed and arranged that closing force applied to the valve is proportional to the undiverted flow in the supply line, a piston in said return line exposed on opposite sides to fluid pressure in said return line, means for producing a pressure drop around said piston in the return line to subject the piston to a force in direction of flow during return flow, means for operatively connecting said piston and valve to prevent movement of said valve independently of that of said piston, the pressure drop produced by said means being adequate to prevent closing movement of said valve during return flow which bears a predetermined relationship to the flow in the supply line, but permitting closing movement of said valve on diminution of the return flow sufficient to alter said relationship.

5. An automatic cut-off device for hydraulic lines comprising in combination a cylindrical valve housing adapted to be coupled at its ends into the hydraulic line, a cylinder inside of and spaced from the inner wall of said housing to provide a fluid passage around said cylinder communicating at both ends with the line, a valve seat in said housing beyond the point of communication of said passage with said line, a piston valve slidable in said cylinder and movable in the direction of flow to close said line, said passage having restricting means to produce a pressure drop having a definite relation to the rate of flow therein, said housing having means including an orifice for diverting a portion of the flow and directing same against one face of the piston to move the piston from a predetermined retracted position and to close said valve upon a predetermined volume of flow through said orifice, said orifice and restricting means being subjected to substantially the same pressure on the upstream side, the other face of said piston being arranged to be subjected to the pressure downstream of the restrictive means, whereby to maintain substantially constant ratio of flow through the passage and through said diverting means despite variations in the rate of flow in said line, said orifice being designed to restrict flow through said diverting means relative to flow through said restricting means so that a substantially predetermined volume of liquid will flow through said passage before seating of said valve.

6. An automatic cut-off device for hydraulic lines comprising in combination a valve housing having a fluid passage therein adapted to be connected with said lines, a valve seat in said passage, a valve chamber in said housing separate from said passage, a piston valve slidable in said chamber toward said seat and arranged to be set to open position, said passage having restricting means for producing a pressure drop which varies with the rate of flow therein, one side of said piston valve being arranged to be subjected to the pressure in said passage downstream of said restricting means, said housing having means including an orifice arranged to be subjected on its upstream side to substantially the pressure upstream of the restricting means and to divert a portion of the flow from said passage and direct the same against the other side of said piston valve, a spring for resiliently holding said piston valve in open position and exerting sufficient pressure against the valve to prevent closing movement thereof in response to forces less than a predetermined value, said pressure drop being effective when in excess of that necessary to cause flow through said orifice against the force of said spring to move said piston valve against the force of said spring to closed position.

7. An automatic cut-off device for hydraulic lines comprising in combination a cylindrical valve housing adapted to be coupled at its ends into the hydraulic line, a cylinder inside of and spaced from the inner wall of said housing to provide a fluid passage around said cylinder communicating at both ends with the line, a valve seat in said housing beyond the point of communication of said passage with said line, a piston valve slidable in said cylinder and movable in the direction of flow to seat against said seat to close said line, said passage having restricting means to produce a pressure drop corresponding to the rate of flow therein, the upstream end of said cylinder having an orifice therein arranged to be subjected on its upstream side to substantially the pressure in said passage upstream of said restricting means and to divert a portion of the flow from said passage and direct the same against one side of the piston to displace the same toward said seat, the other side of said piston valve being arranged to be subjected to the pressure downstream of said restricting means, a spring in said cylinder bearing against the other side of said piston and exerting sufficient pressure against the said piston to prevent closing movement thereof under undesired forces, said pressure drop being effective when in excess of that necessary to displace said piston against the pressure of said spring to cause flow through said orifice and thereby to move said piston valve to closed position.

WILLIAM WATERMAN.

REFERENCES CITED

The following references are of record in the file of this patent:

UNITED STATES PATENTS

| Number | Name | Date |
|---|---|---|
| 2,227,297 | Coy | Dec. 31, 1940 |
| 2,307,949 | Phillips | Jan. 12, 1943 |
| 2,351,035 | Grant | June 13, 1944 |
| 2,354,161 | Waterman | July 18, 1944 |

FOREIGN PATENTS

| Number | Country | Date |
|---|---|---|
| 114,724 | Germany | 1900 |
| 197,913 | Germany | 1908 |
| 669,897 | France | 1929 |

OTHER REFERENCES

A. P. C. Publication of Wunch, 362,699. (Published May 11, 1943.)